United States Patent
Wang et al.

(10) Patent No.: US 9,460,344 B2
(45) Date of Patent: Oct. 4, 2016

(54) GENERATING MULTI-LOGOGRAM PHRASES FROM LOGOGRAM RADICALS

(71) Applicant: LENOVO (Singapore) PTE, LTD., New Tech Park (SG)

(72) Inventors: Song Wang, Cary, NC (US); Jian Li, Chapel Hill, NC (US); Ming Qian, Cary, NC (US); Bradley Park Strazisar, Cary, NC (US); Qigang Wang, Beijing (CN); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/512,768

(22) Filed: Oct. 13, 2014

(65) Prior Publication Data
US 2016/0104038 A1    Apr. 14, 2016

(51) Int. Cl.
*G06K 9/18* (2006.01)
*G06K 9/00* (2006.01)

(52) U.S. Cl.
CPC ................................ *G06K 9/00402* (2013.01)

(58) Field of Classification Search
USPC ....... 382/170, 171, 186, 190, 209, 292, 185; 358/1.11, 538, 539, 462
See application file for complete search history.

(56) References Cited

U.S. PATENT DOCUMENTS

| | | | | |
|---|---|---|---|---|
| 7,174,288 B2* | 2/2007 | Ju | ............................ | G06F 3/018 704/2 |
| 7,263,658 B2* | 8/2007 | Chou | ........................ | G06F 3/018 715/262 |
| 7,280,240 B2* | 10/2007 | Nishio | ................. | H04N 1/00132 358/1.1 |
| 7,424,156 B2* | 9/2008 | Huang | ................... | G06K 9/6293 382/179 |
| 7,478,033 B2* | 1/2009 | Wu | ........................ | G06F 17/2223 704/1 |
| 7,788,253 B2* | 8/2010 | Grennan | .............. | G06F 17/2235 707/709 |
| 7,861,164 B2* | 12/2010 | Qin | ........................ | G06F 3/0233 715/264 |
| 8,316,295 B2* | 11/2012 | Li | .......................... | G06F 17/2863 704/5 |
| 8,515,176 B1* | 8/2013 | Sankaranarayanan | | G06K 9/00463 382/185 |
| 8,677,237 B2* | 3/2014 | Li | .......................... | G06F 3/04883 715/263 |

* cited by examiner

*Primary Examiner* — Yosef Kassa
(74) *Attorney, Agent, or Firm* — Kunzler Law Group

(57) ABSTRACT

For generating multi-logogram phrases from logogram radicals, code may recognize one or more logogram radicals from the display. In addition, the code may generate one or more logogram phrases from the one or more logogram radicals.

20 Claims, 14 Drawing Sheets

250

| Radical Group 255 | Logogram Phrase 260 | Personal Frequency 230 | Communal Frequency 235 |
|---|---|---|---|
| Radical Group 255 | Logogram Phrase 260 | Personal Frequency 230 | Communal Frequency 235 |
| Radical Group 255 | Logogram Phrase 260 | Personal Frequency 230 | Communal Frequency 235 |
| Radical Group 255 | Logogram Phrase 260 | Personal Frequency 230 | Communal Frequency 235 |

GENERATING MULTI-LOGOGRAM PHRASES FROM LOGOGRAM RADICALS

FIELD

The subject matter disclosed herein relates to generating multi-logogram phrases and more particularly relates to generating multi-logogram phrases from logogram radicals.

BACKGROUND

Description of the Related Art

Entering logograms can be time-consuming because of the large number of strokes required for many logograms, and because of the large number of phonetic homonyms.

BRIEF SUMMARY

An apparatus for generating multi-logogram phrases from logogram radicals is disclosed. The apparatus includes a graphical input, a display, a processor, and a memory. The graphical input may accept handwritten input. The display may display the handwritten input. The memory may store code executable by the processor. The code recognizes one or more logogram radicals from the display. In addition, the code generates one or more logogram phrases from the one or more logogram radicals. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
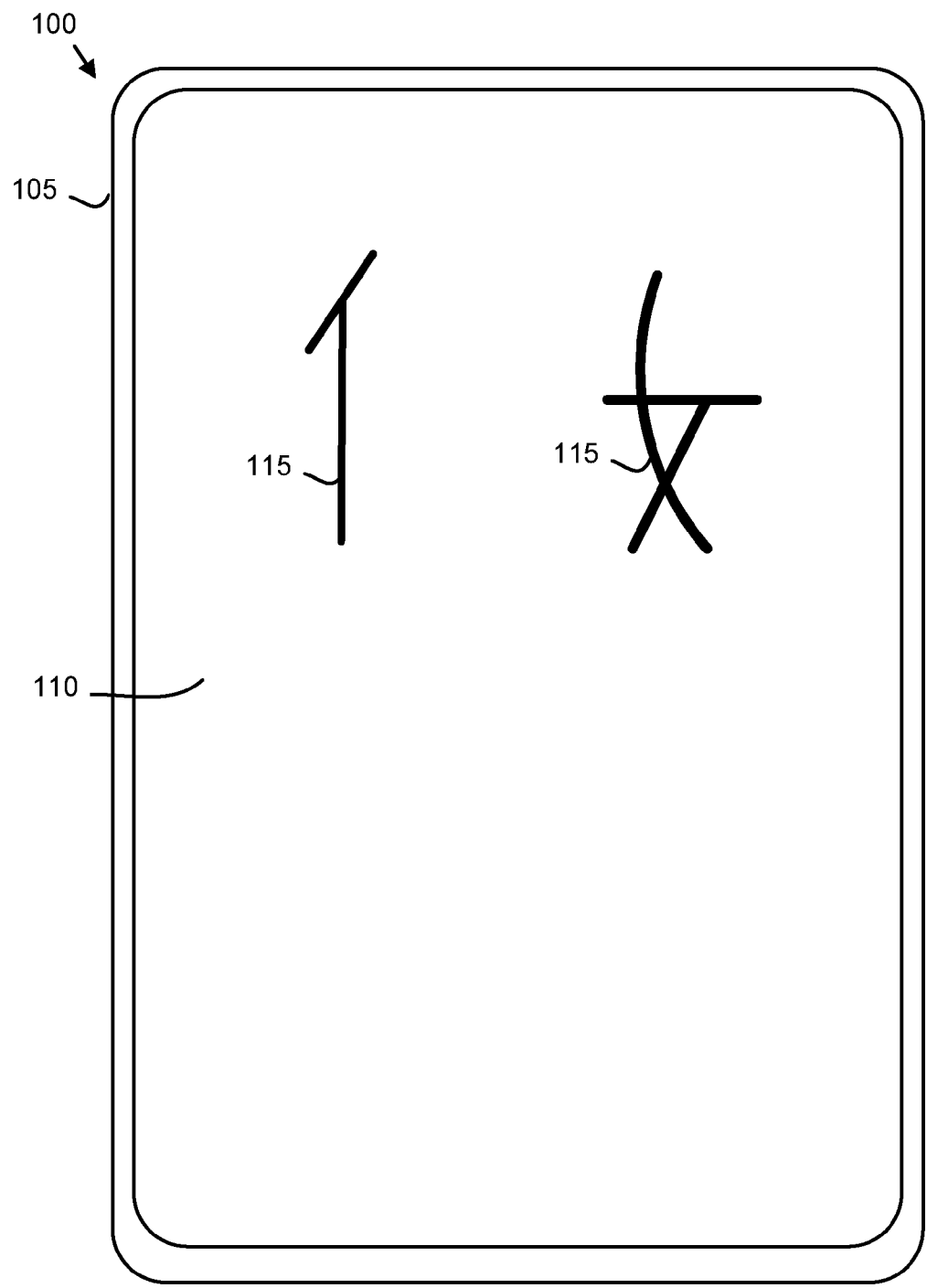
FIG. 1 is a front view drawing illustrating one embodiment of a graphical input and display.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a front view drawing illustrating one embodiment of a graphical input 105 and display 110. The graphical input 105 and the display 110 may be embodied in an electronic device 100 such as a tablet computer, a mobile phone, a laptop computer, a computer workstation, and the like. In the depicted embodiment, the graphical input 105 is integrated with the display 110. The graphical input 105 may receive handwritten logograms and, as is depicted, logogram radicals 115. The electronic device 100 may recognize the logograms and/or logogram radicals 115 and render the recognize logograms and/or logogram radicals 115.

Logograms are often based on Chinese characters, and may include traditional Chinese characters, simplified Chinese characters, Korean characters, Japanese characters, and the like. Logograms typically include a plurality of strokes. In addition, strokes must often be entered in a specified order. Logogram strokes include a logogram radical. Logogram radicals are often used in many different logograms and are often easily recognizable.

Logograms may also be entered phonetically. For example, the PINYIN phonetic alphabet may be used to generate Chinese logograms. Unfortunately, most logograms have many phonetic homonyms. As a result, phonetic representations generate a large number of candidate logograms.

Logograms are often entered into a graphical input 105 by entering each stroke of the logogram. Unfortunately, writing all the strokes of a logogram can be time-consuming. In addition, if the user is unfamiliar with all of the strokes of a logogram, or of the order of the strokes, the user may be unable to enter a desired logogram.

The embodiments described herein recognize logogram radicals from the display 110 and generate logogram phrases for the logogram radicals. As a result, the user may enter the logogram phrase by only making a few strokes for the relevant logogram radicals. The user may thus generate logogram phrases more rapidly. In addition, the user is not required to render all the strokes of a logogram or render the strokes of the logogram in the specified order.

In the depicted embodiment, two logogram radicals 115 are entered. A logogram phrase may be generated from the logogram radicals 115 as will be described hereafter.

Figure 2A:
FIG. 2A is a schematic block diagram illustrating one embodiment of a logogram radical table.

FIG. 2A is a schematic block diagram illustrating one embodiment of a logogram radical table 200. The logo radical table 200 may be organized as a data structure and stored in a memory. The logogram radical table 200 may generate logogram radicals 210. The logogram radical table 200 includes radical characteristics 205 and logogram radicals 115.

The radical characteristics 205 describe characteristics of each corresponding logogram radical 115. The characteristics of logogram radicals 115 that are rendered on the display 110 may be compared with the radical characteristics 205. Radical characteristics 205 may be selected that most closely match the characteristics of logogram radicals 115 that are rendered on the display, which may then be recognized as the corresponding logogram radical 115.

Figure 2B:
FIG. 2B is a schematic block diagram illustrating one embodiment of a logogram usage history.

FIG. 2B is a schematic block diagram illustrating one embodiment of a logogram usage history 220. The logogram usage history 220 may be organized as a data structure and stored in a memory. The logogram usage history 220 may be used to generate a logogram 225 from a logogram radical 115. In the depicted embodiment, the logogram usage history 220 includes a plurality of entries with each entry including a logogram radical 115, a logogram 225, a personal usage frequency 230, and a communal usage frequency 235.

The logogram usage history 220 may include each logogram 225 and the logogram's corresponding logogram radical 115. In addition, the communal usage frequency 235 for the logogram 225 may be recorded. In one embodiment, the communal usage frequency 235 measures how often each logogram 225 is likely to be the desired logogram. In addition, the communal usage frequency 235 may measure how often each logogram 225 is likely to be the desired logogram when the logogram radical 115 is rendered.

For example, the communal usage frequency 235 may be generated from analyzing logogram text. Total usages of a logogram 225 may be divided by total uses of the logogram radical 115 in the text to calculate the communal usage frequency 235. The communal usage frequency 235 may represent typical logogram usage in a community such as all logogram users, all logogram commercial text, all logogram social media text, all logogram personal text, all logogram text for a specified age group, and/or all logogram media text.

The logogram usage history 220 also includes a personal usage frequency 230. The personal usage frequency 230 may measure how often each logogram 225 is likely to be the desired logogram of a target user, such as the user of the electronic device 100. The personal usage frequency 230 may be generated by analyzing logogram text from the target user. Total uses of a logogram 225 may be divided by total uses of the logogram radical 115 by the target user to calculate the personal usage frequency 230.

In one embodiment, the personal usage frequency 230 is weighted to favor recent uses of the logogram 225. For example, the personal usage frequency PUF 230 for a logogram 225 may be calculated using Equation 1, where LU is a logogram usage instance of the logogram 225, UT is a usage time interval to the logogram usage instance, and RU is a total number of logogram radical usage instances.

$$PUF = (\Sigma LU/UT)/RU \qquad \text{Equation 1}$$

Figure 2C:
FIG. 2C is a schematic block diagram illustrating one embodiment of a logogram phrase usage history.

FIG. 2C is a schematic block diagram illustrating one embodiment of logogram phrase usage history 250. The logogram phrase usage history 250 may be organized as a data structure and stored in a memory. The logogram phrase usage history 250 may be used to generate a logogram phrase 260 of two or more logograms 225 from a radical group 255 of two or more logogram radicals 115. In the depicted embodiment, the logogram phrase usage history 250 includes a plurality of entries with each entry including a radical group 255, a logogram phrase 260, a personal usage frequency 230, and a communal usage frequency 235.

The logogram phrase usage history 250 may include all logogram phrases 260 or a commonly used portion thereof. In addition, the logogram phrase usage history 250 includes the logogram radicals 115 of each logogram 225 in the logogram phrase 260 in the radical group 225. For example, if a logogram phrase 260 included two logograms 225 in a specified order, the radical group 225 includes the logogram radicals 115 for the two logograms 225 in the same specified order.

The communal usage frequency 235 may be generated by analyzing logogram text for a community such as all logogram users, all logogram commercial text, all logogram social media text, all logogram personal text, all logogram text for a specified age group, and/or all logogram media text. The communal usage frequency 235 may be calculated as total usages of a logogram phrase 260 divided by total uses of the radical group 225 in the text.

The personal usage history 220 may measure how frequently each logogram phrase 260 is likely to be the desired logogram phrase of the target user. The personal usage frequency 230 may be generated by analyzing logogram text from the target user. Total uses of the logogram phrase 260 may be divided by total uses of the radical group 255 by the target user to generate the personal usage history 220.

The personal usage frequency 230 may be weighted to favor recent uses of the logogram phrase 260. For example, the personal usage frequency PUF 230 for a logogram phrase 260 may be calculated using Equation 1, where LU is a logogram phrase usage instance of the logogram phrase 260, UT is a usage time interval to the logogram phrase usage instance, and RU a total number of logogram radical group usage instances.

Figure 3A:
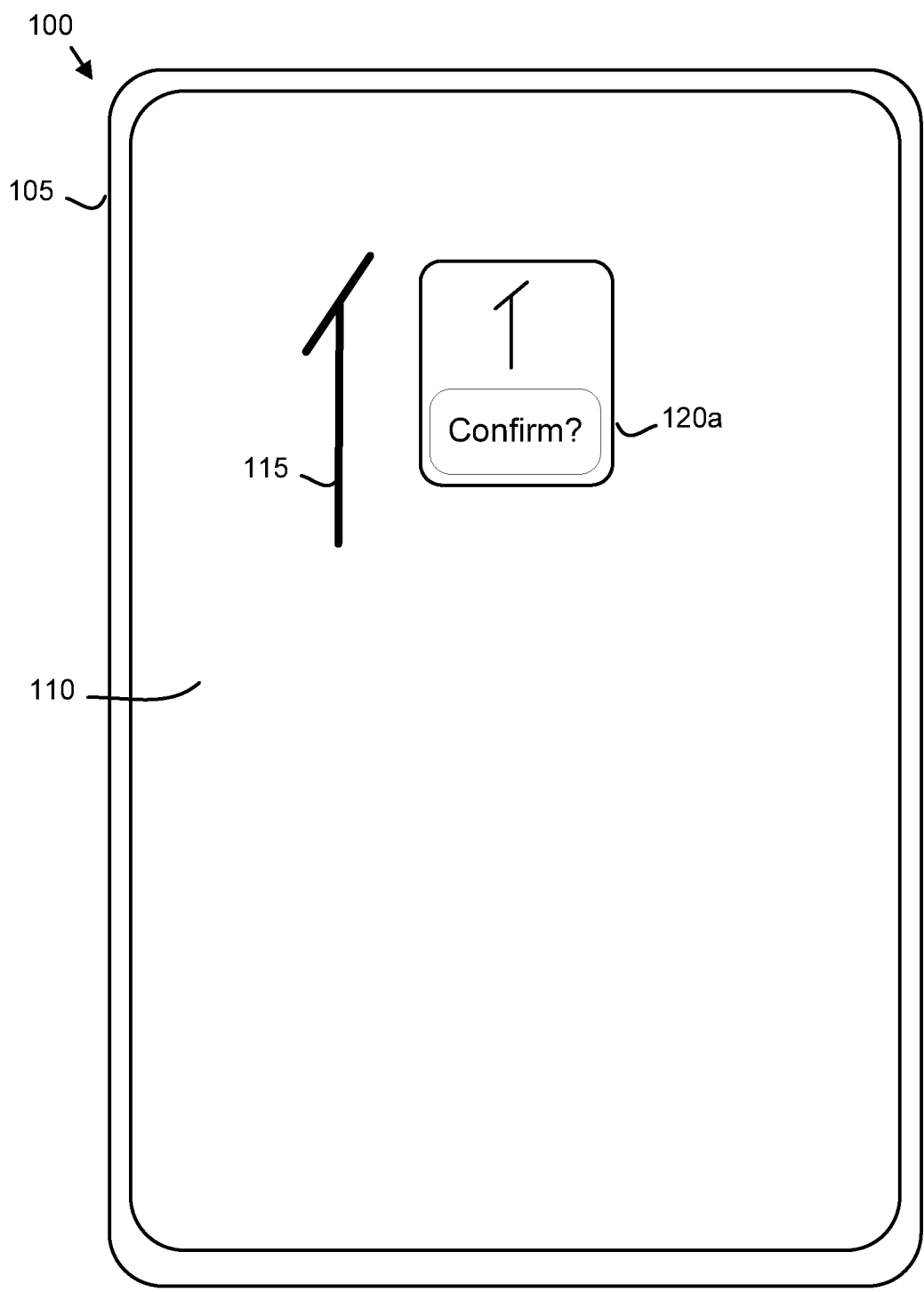
FIG. 3A is a front view drawing illustrating one embodiment of verifying a logogram radical.

FIG. 3A is a front view drawing illustrating one embodiment of verifying a logogram radical 115 on the electronic device 100. In the depicted embodiment, the user has rendered a logogram radical 115. In addition, a candidate for the logogram radical 115 has been recognized and is displayed for verification. The verification 120a is depicted as a confirmation button. The user may select the confirmation button to verify the logogram radical 115.

Figure 3B:
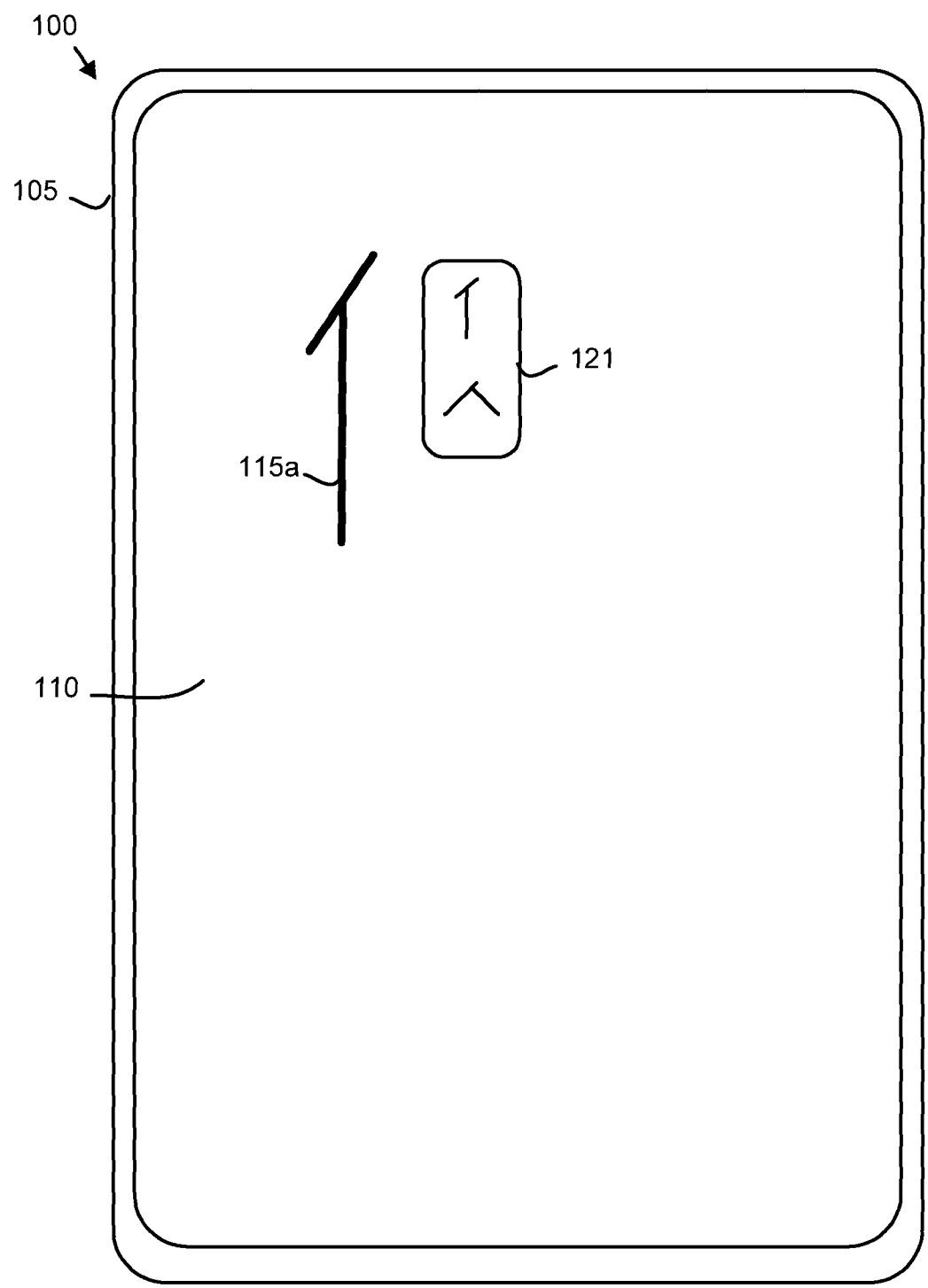
FIG. 3B is a front view drawing illustrating one embodiment of selecting a logogram radical.

FIG. 3B is a front view drawing illustrating one embodiment of selecting a logogram radical 115 on the electronic device 100. In the depicted embodiment, the user has rendered the logogram radical 115. Two candidates for the logogram radical 115 have been recognized and are displayed in a candidate logogram radical list 121 for selection. The user may select one of the candidate logogram radicals 115 from the candidate logogram radical list 121.

Figure 3C:
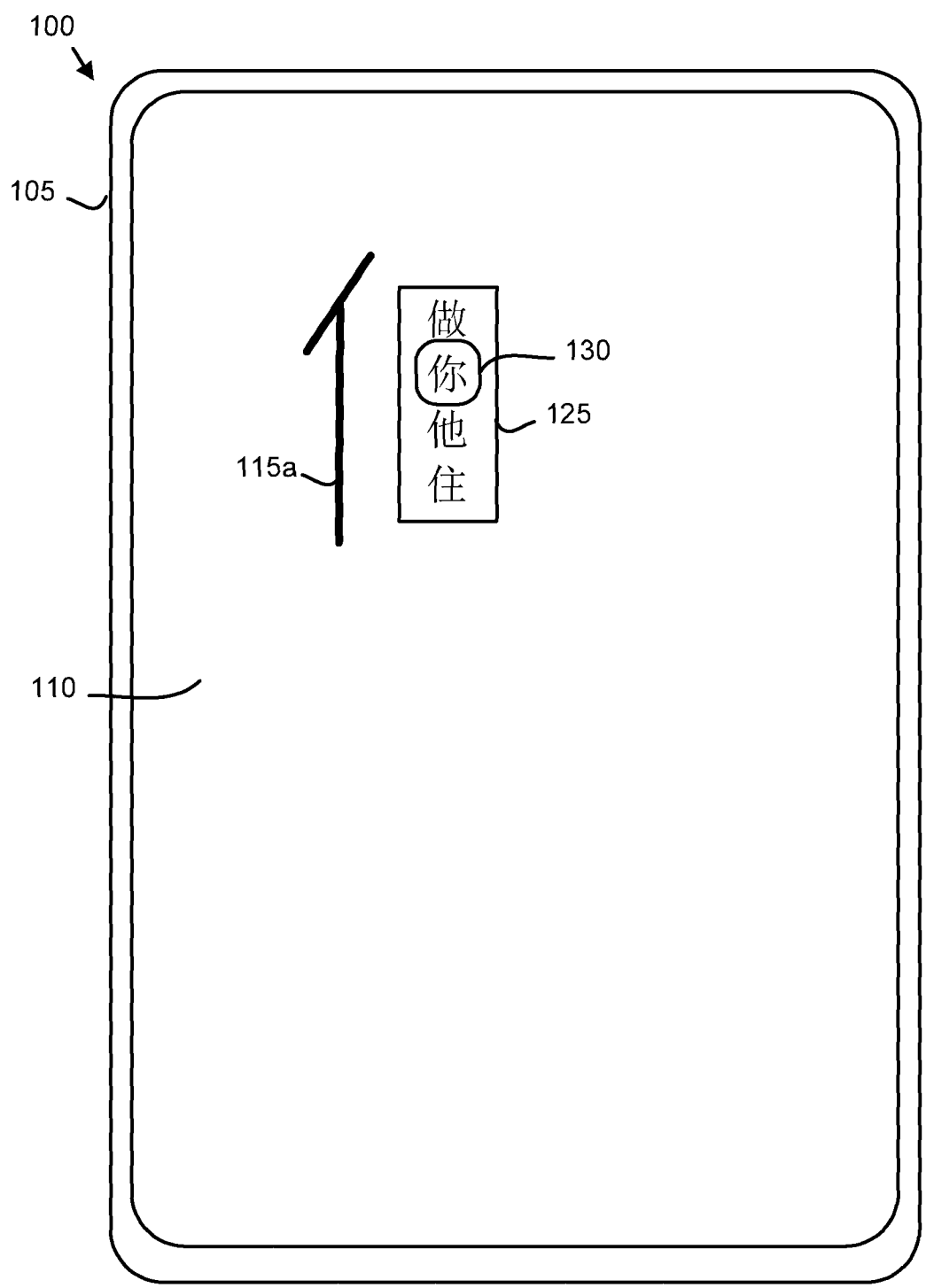
FIG. 3C is a front view drawing illustrating one embodiment of selecting a logogram.

FIG. 3C is a front view drawing illustrating one embodiment of selecting a logogram 225 on the electronic device 100. In the depicted embodiment, the user has rendered the logogram radical 115. In response, a logogram list 125 is displayed. Each logogram on the logogram list 125 embodies the logogram radical 115. In one embodiment, the logogram list 125 is based on and prioritized using the logogram usage history 220. The user may select a logogram selection 130 from the logogram list 125.

Figure 3D:
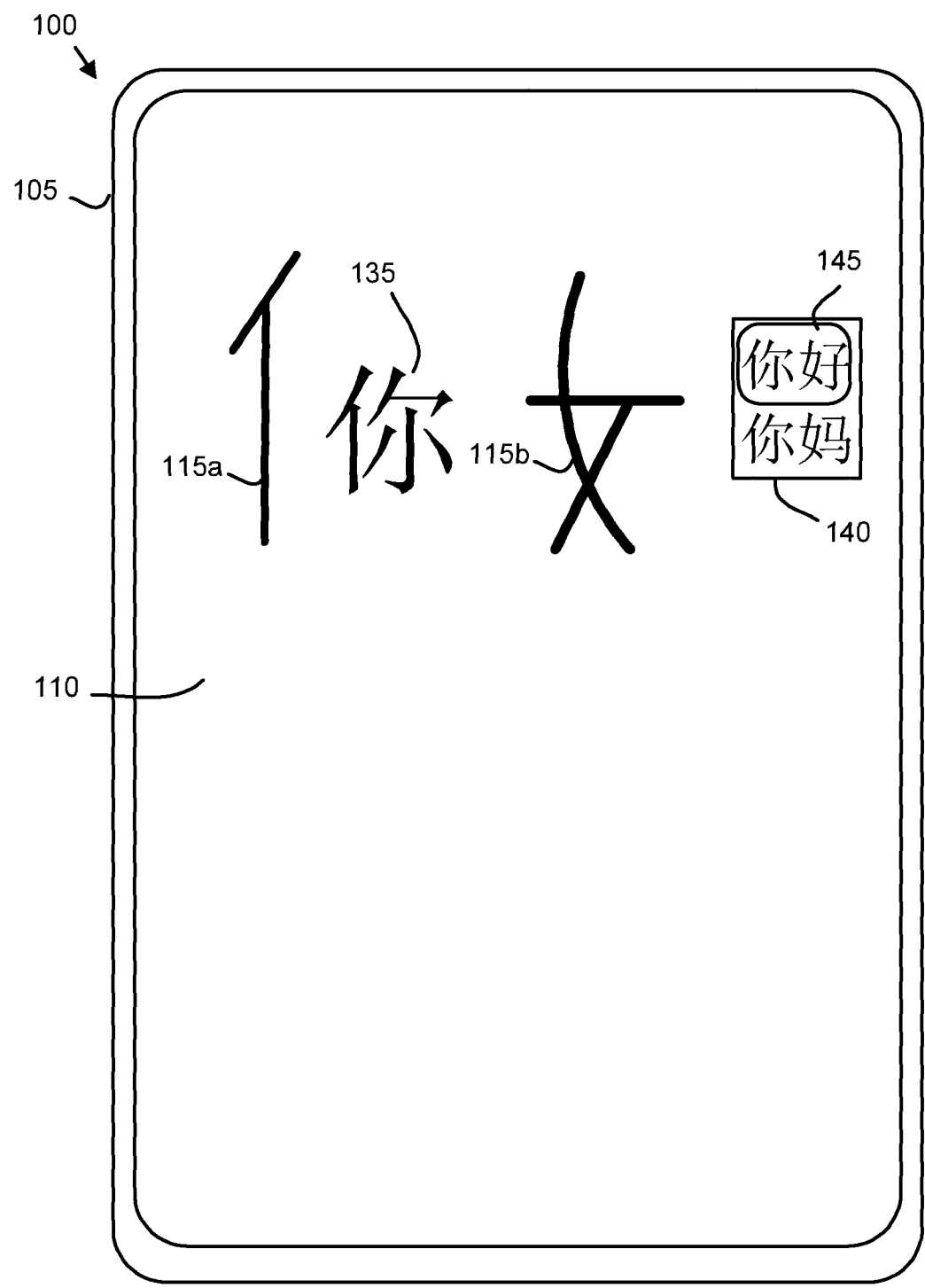
FIG. 3D is a front view drawing illustrating one embodiment of selecting a logogram phrase.

FIG. 3D is a front view drawing illustrating one embodiment of selecting a logogram phrase 260 on the electronic device 100. In the depicted embodiment, the desired logogram 130 of FIG. 3C corresponding to the first logogram radical 115a is rendered as a first logogram 135. A second logogram radical 115b entered by the user is also rendered on the display 110.

A logogram phrase list 140 is displayed with one or more logogram phrases 260 generated in response to the first logogram 135 and the second logogram radical 115b. In one embodiment, the logogram phrase list 140 is based on and prioritized using the logogram phrase usage history 250. The user may select a desired logogram phrase selection 145.

Figure 3E:
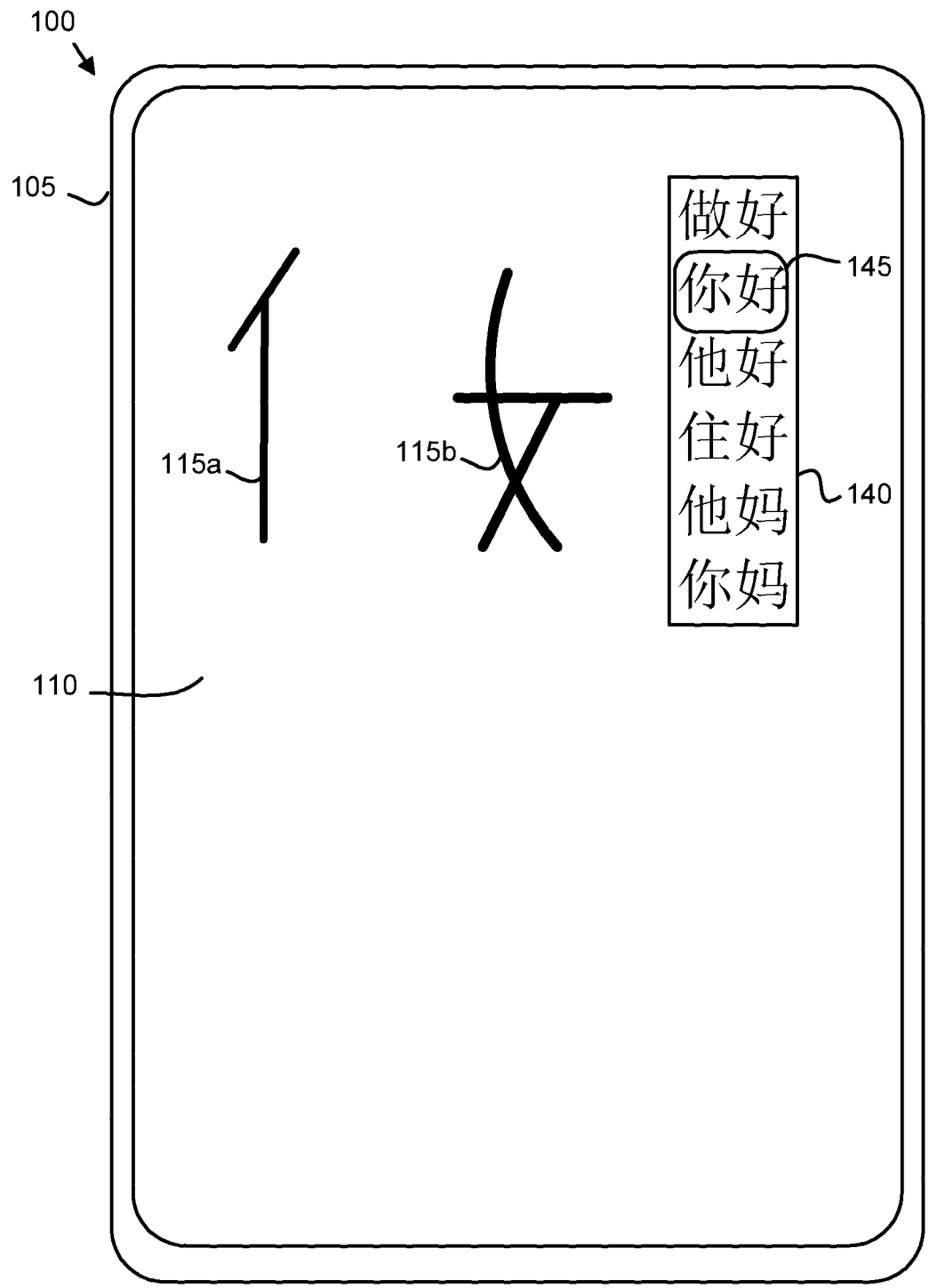
FIG. 3E is a front view drawing illustrating one alternate embodiment of selecting a logogram phrase.

FIG. 3E is a front view drawing illustrating one alternate embodiment of selecting a logogram phrase 260 on the electronic device 100. In the depicted embodiment, the user has entered a first logogram radical 115a and a second logogram radical 115b. A logogram phrase list 140 is displayed in response to the two logogram radicals 115. Each logogram phrase 260 on the logogram phrase list 140 includes a logogram 225 embodying one of the logogram radicals 115. In addition, each logogram 225 is in the same order as the logogram's corresponding logogram radical 115. The user may select a desired logogram phrase 145.

Figure 3F:
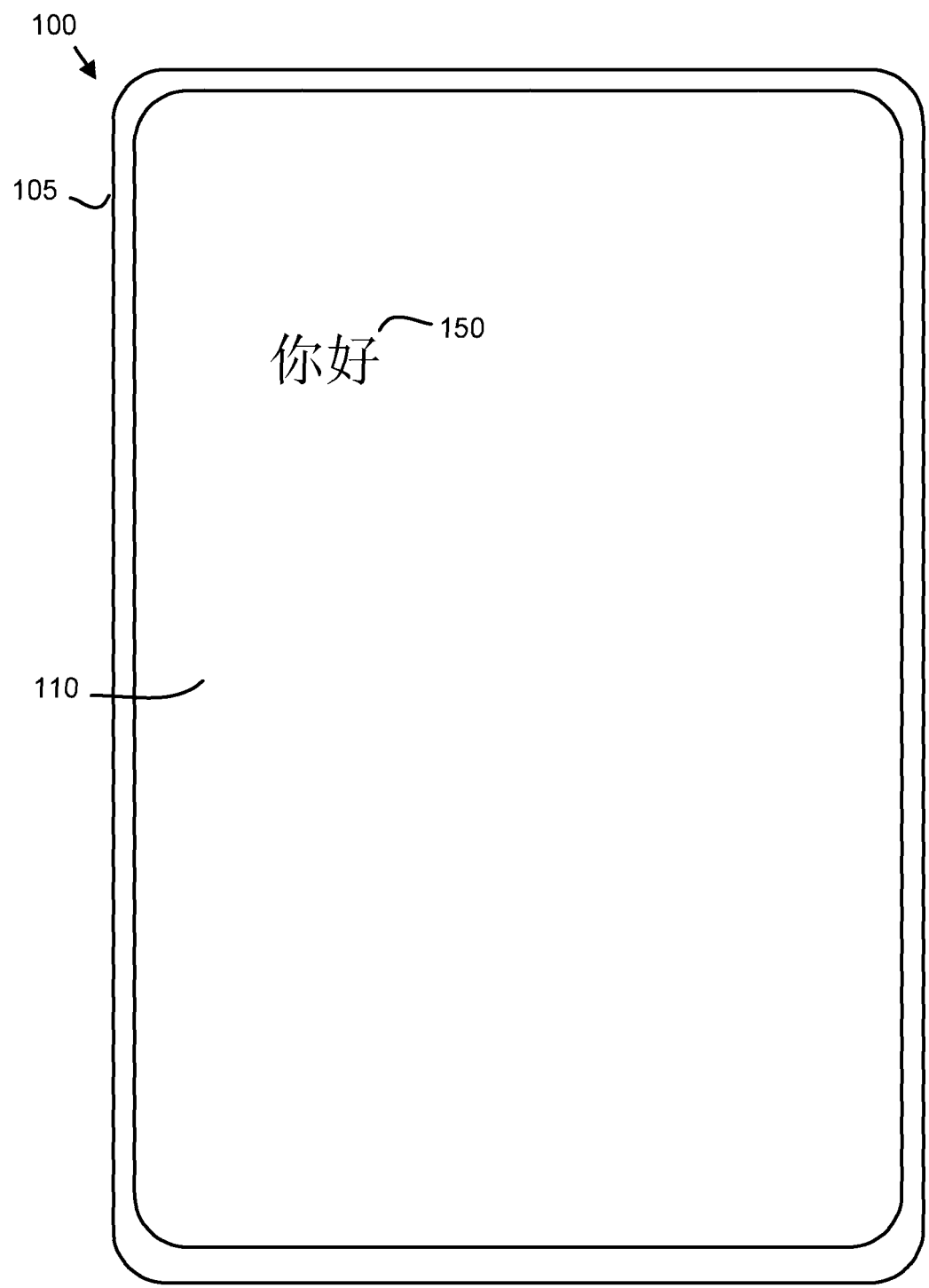
FIG. 3F is a front view drawing illustrating one embodiment of a generated logogram phrase.

FIG. 3F is a front view drawing illustrating one embodiment of a generated logogram phrase 150. In the depicted embodiment, the desired logogram phrase selection 145 of FIGS. 3D and 3E is rendered as the generated logogram phrase 150.

Figure 4:
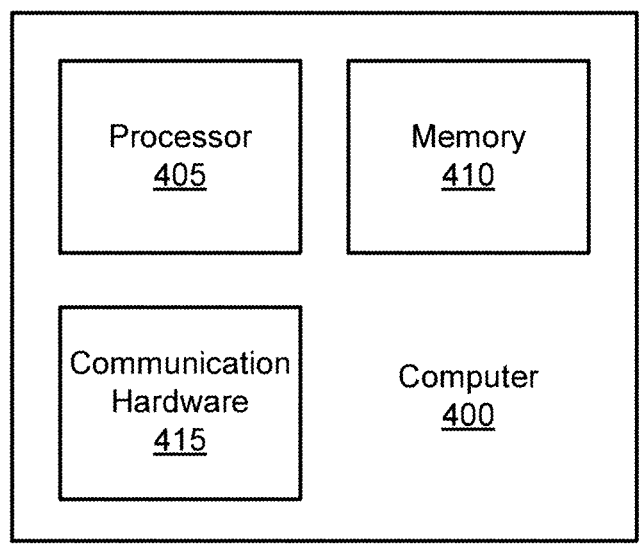
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be in communication with the electronic device 100. The computer 100 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices.

Figure 5A:
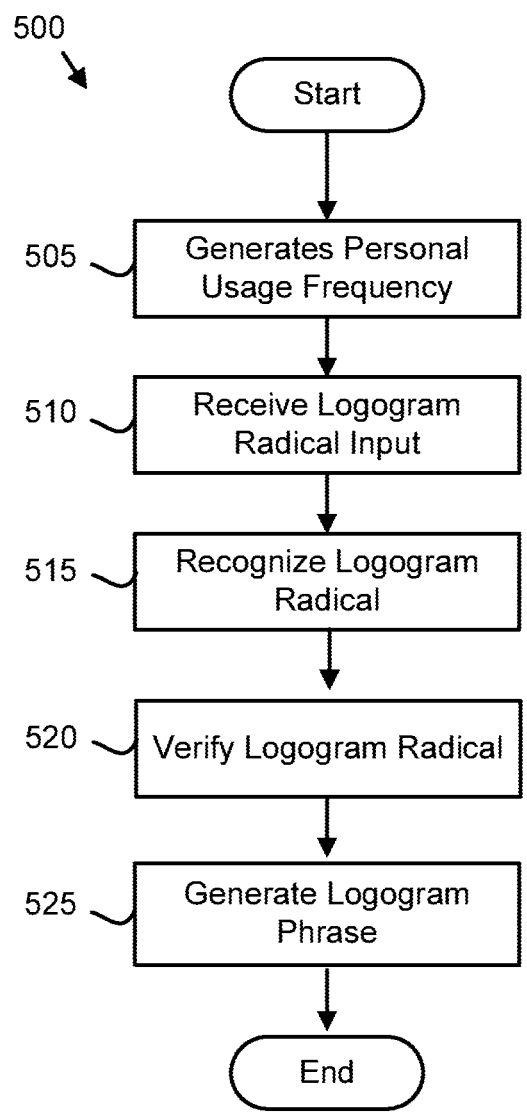
FIG. 5A is a schematic flow chart diagram illustrating one embodiment of a logogram phrase generation method.

FIG. 5A is a schematic flow chart diagram illustrating one embodiment of a logogram phrase generation method 500. The method 500 may generate a logogram phrase 260 such as a logogram phrase selection 145. The method 500 may be performed by the processor 405. Alternatively, the method 500 may be performed by computer readable storage medium such as the memory 410. The computer readable storage medium may store code that is executed by the processor 405 to perform the functions of the method 500.

The method 500 starts, and in one embodiment, the code generates 505 the personal usage frequency 230 for one or more logogram's 225 and/or one or more logogram phrases 260. In one embodiment, the code analyzes text samples from the target user to calculate 505 the personal usage history 230. Alternatively, the code may regenerate 505 the personal usage frequency 230 for each logogram 225 and/or each logogram phrase 260 as the logogram 225 and/or logogram phrase 260 are entered on the electronic device 100 by the target user. In addition, the code may download the communal usage frequency 235.

The code may further receive 510 logogram radical input such as is illustrated in FIG. 1. For example, a user may enter one or more logogram radicals 115. In addition, the code may recognize 515 the one or more logogram radicals 115 from the logogram radical input. In one embodiment, the code parses characteristics from the logogram radical input. In addition, the code may identify radical characteristics 205 in the logogram radical table 200 that match the characteristics of the logogram radical input. In one embodiment, the code recognizes 515 a single logogram radical 115 with radical characteristics 205 that best match the characteristics of the logogram radical input. Alternatively, the code may recognize 515 the logogram radical 115 from the one or more logogram radicals 115 as described in FIG. 5D.

In one embodiment, the code verifies 520 the logogram radical 115. The code may display one candidate logogram radical 115 for verification as shown in FIG. 3A. The code may further verify 520 the candidate logogram radical 115 in response to user input.

The code may generate 525 one or more logogram phrases 260 for the one or more logogram radicals 115 and the method 500 ends. In one embodiment, the one or more logogram phrases are embodied in a logogram phrase list 140. The one or more logogram phrases 260 may be generated 525 in response to the logogram phrase usage history 250 and/or the logogram usage history 220. Embodiments of generating 525 the logogram phrases 260 are described in more detail in FIGS. 5B-C.

Figure 5B:
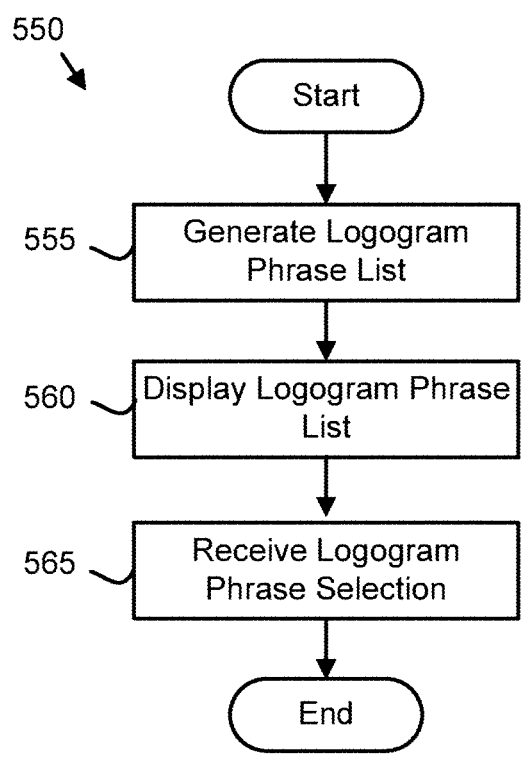
FIG. 5B is a schematic flow chart diagram illustrating one alternate embodiment of a logogram phrase generation method.

FIG. 5B is a schematic flow chart diagram illustrating one alternate embodiment of a logogram phrase generation method 550. The method 550 may be performed by the processor 405. Alternatively, the method 550 may be performed by computer readable storage medium such as the memory 410. The computer readable storage medium may store code that is executed by the processor 405 to perform the functions of the method 550.

The method 550 starts, and in one embodiment, the code generates 555 a logogram phrase list 140 of one or more logogram phrases 260. The logogram phrase list 140 may comprise a first logogram 225 embodying a first logogram radical 115a and a second logogram 225 embodying a second logogram radical 115b of one or more logogram radicals 115 recognized 515 from the display 110. In addition, the logogram phrases 260 in the logogram phrase list 140 may include additional logograms 225 if three or more logogram radicals 115 are received 510 as the logogram radical input.

In one embodiment, the one or more logogram phrases 260 of the logogram phrase list 140 are generated in response to the logogram phrase usage history 250. The logogram phrase list 140 may based on and prioritized using the logogram phrase usage history 250.

In one embodiment, the logogram phrases 260 with the highest personal usage frequency 230 are generated 555 to the logogram phrase list 140. Alternatively, the logogram phrases 260 with the highest communal usage frequency 235 may be generated 555 to the logogram phrase list 140. In addition, the logogram phrases with 260 in the logogram phrase list 140 may be prioritized using the personal usage frequency 230 and/or the communal usage frequency 235.

In one embodiment, logogram phrases 260 are generated 555 to the logogram phrase list 140 in response to both the personal usage frequency 230 and the communal usage frequency 235. For example, a usage score US may be calculated for each logogram using Equation 2, where IS is an instance size of text that has been analyzed for the personal usage frequency 230 and CUF is the communal usage frequency 235. IS may be normalized to a value of one for a maximum instance size and to proportionately smaller values for an instance size less than the maximum instance size. Thus as the instant size for the personal usage frequency 230 increases, logogram phrases 260 are increasingly selected based on the personal usage frequency 230.

$$US=(IS*PUF)+((1-IS)*CUF) \quad \text{Equation 2}$$

In addition, the code may display 560 the logogram phrase list 140 on the display 110 as shown in FIG. 3E and receive 565 a logogram phrase selection 145 and the method 550 ends. The logogram phrase selection 145 may become the generated logogram phrase 150.

Figure 5C:
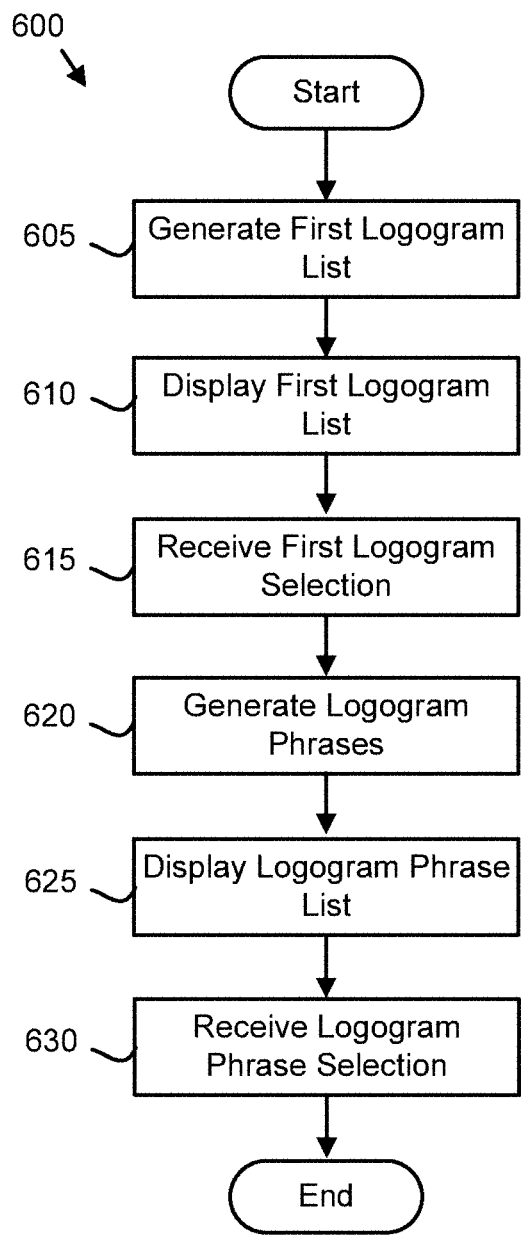
FIG. 5C is a schematic flow chart diagram illustrating one alternate embodiment of a logogram phrase generation method.

FIG. 5C is a schematic flow chart diagram illustrating one alternate embodiment of a logogram phrase generation method 600. The method 600 may be performed by the processor 405. Alternatively, the method 600 may be performed by computer readable storage medium such as the memory 410. The computer readable storage medium may store code that is executed by the processor 405 to perform the functions of the method 600.

The method 600 starts, and in one embodiment, the code generates 605 a first logogram list 125 in response to a first logogram radical 115a. The first logogram radical 115a may be recognized 515 as described in FIG. 5A. Alternatively, the first logogram radical 115a may be received 615 as a radical selection as described hereafter in FIG. 5D. In addition, the first logogram radical 115a may be verified 520 as described in FIG. 5A.

The first logogram list 125 may include logograms 225 embodying the first logogram radical 115a. In one embodiment, the first logogram list 125 is based on the logogram usage history 220. The logograms 225 with the highest personal usage frequency 230 may be generated 605 for the first logogram list 125. Alternatively, the logograms 225 with the highest communal usage frequency 235 may be generated 605 for the first logogram list 125. A specified list number of logograms 225 may be included in the first logogram list 125.

In one embodiment, the logograms 225 of the first logogram list 125 are generated 605 based on both the personal usage frequency 230 and the communal usage frequency 235 of each logogram 225. For example, the logograms 225 with the highest usage score calculated using Equation 2 may be selected for the first logogram list 125. In addition, the logograms 225 of the first logogram list 125 may be prioritized using the personal usage frequency 230, the communal usage frequency 235, or combinations thereof.

The code may display 610 the first logogram list 125 as shown in FIG. 3C. In addition, the code may receive 615 a first logogram selection 130 of a first logogram selection 130 from the first logogram list 125. The selected first logogram 130 may be rendered as the first logogram 135 as shown in FIG. 3D.

In one embodiment, the code generates 620 one or more logogram phrases 260 in response to the first logogram 135 and the second logogram radical 115b as shown in FIG. 3D. The one or more logogram phrases 260 may be embodied in a logogram phrase list 140. The one or more logogram phrases 260 may each include the first logogram 135 and a second logogram 225 comprising the second logogram radical 115b.

The code may display 625 the logogram phrase list 140 as shown in FIG. 3D. In addition, the code may receive 630 a logogram phrase selection 145 and the method 600 ends. The logogram phrase selection 145 may be the generated logogram phrase 150.

Figure 5D:
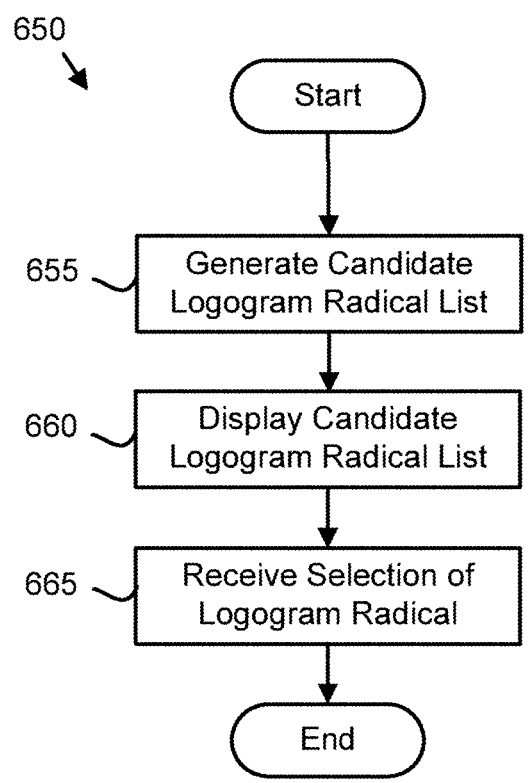
FIG. 5D is a schematic flow chart diagram illustrating one embodiment of recognizing a logogram radical.

FIG. 5D is a schematic flow chart diagram illustrating one embodiment of recognizing a logogram radical 115. The method 650 recognizes a logogram radical 115 from logogram radical input. The method 650 may be performed by the processor 405. Alternatively, the method 650 may be performed by computer readable storage medium such as the memory 410. The computer readable storage medium may store code that is executed by the processor 405 to perform the functions of the method 650.

The method 650 starts, and in one embodiment, the code generates 655 a candidate logogram radical list 121 of one or more logogram radicals 115 with radical characteristics 205 that match characteristics of the logogram radical input. In addition, the code may display 660 the candidate logogram radical list 121 as shown in FIG. 3B. In one embodiment, the code receives 665 a selection of a logogram radical 115 and the method 650 ends. The user may select a logogram radical 115 from the candidate logogram radical list 121. The selected logogram radical 115 may be recognized as the logogram radical 115.

The embodiments recognize one or more logogram radicals 115 and generate one or more logogram phrases 260 for the one or more logogram radicals 115. A user may select one of the logogram phrases 260 to quickly generate a desired logogram phrase 260 after entering only logogram radicals 115. As a result, the entry of logograms is greatly simplified, requiring only that the user be familiar with and enter the logogram radicals 115 for the desired logogram phrase 260.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a graphical input that accepts handwritten input;

a display that displays the handwritten input;
a processor;
a memory that stores code executable by the processor to:
recognizes two or more logogram radicals from the display; and
generate one or more logogram phrases for the two or more logogram radicals, wherein each logogram phrase comprises a first logogram embodying a first logogram radical of the two or more logogram radicals and a second logogram embodying a second logogram radical of the two or more logogram radicals.

2. The apparatus of claim 1, wherein the one or more logogram phrases are generated in response to a usage history.

3. The apparatus of claim 2, wherein the usage history comprises one or more of a personal usage frequency for a plurality of logogram phrases and a communal usage frequency for the plurality of logogram phrases.

4. The apparatus of claim 1, wherein the code is further executable by the process to:
display a logogram phrase list of the one or more logogram phrases; and
receive a selection of a first logogram phrase.

5. The apparatus of claim 4, wherein the logogram phrase list is based on and prioritized using a usage history.

6. The apparatus of claim 1, wherein the code is further executable by the processor to:
display a first logogram list of logograms embodying the first logogram radical of the two or more logogram radicals based on a usage history; and
receive a selection of a first logogram from the first logogram list,
wherein the one or more logogram phrases are generated in response to the first logogram and the second logogram radical of the two or more logogram radicals.

7. The apparatus of claim 1, wherein the code is further executable by the processor to:
display a candidate logogram radical list of the two or more logogram radicals; and
receive a selection of a logogram radical.

8. A method comprising:
recognizing, by use of a processor, two or more logogram radicals; and
generating one or more logogram phrases for the two or more logogram radicals, wherein each logogram phrase comprises a first logogram embodying a first logogram radical of the two or more logogram radicals and a second logogram embodying a second logogram radical of the two or more logogram radicals.

9. The method of claim 8, wherein the one or more logogram phrases are generated in response to a usage history.

10. The method of claim 9, wherein the usage history comprises one or more of a personal usage frequency for a plurality of logogram phrases and a communal usage frequency for the plurality of logogram phrases.

11. The method of claim 8, the method further comprising:
displaying a logogram phrase list of the one or more logogram phrases; and
receiving a selection of a first logogram phrase.

12. The method of claim 11, wherein the logogram phrase list is based on and prioritized using a usage history.

13. The method of claim 8, the method further comprising:
displaying a first logogram list of logograms embodying the first logogram radical of the two or more logogram radicals based on a usage history; and
receiving a selection of a first logogram from the first logogram list,
wherein the one or more logogram phrases are generated in response to the first logogram and the second logogram radical of the two or more logogram radicals.

14. The method of claim 8, the method further comprising:
displaying a candidate logogram radical list of the two or more logogram radicals; and
receiving a selection of a logogram radical.

15. A program product comprising a non-transitory computer readable storage medium that stores code executable by a processor, the executable code comprising code to perform:
recognizing two or more logogram radicals; and
generating one or more logogram phrases for the two or more logogram radicals, wherein each logogram phrase comprises a first logogram embodying a first logogram radical of the two or more logogram radicals and a second logogram embodying a second logogram radical of the two or more logogram radicals.

16. The program product of claim 15, the code further performing:
displaying a logogram phrase list of the one or more logogram phrases; and
receiving a selection of a first logogram phrase.

17. The program product of claim 16, wherein the usage history comprises one or more of a personal usage frequency for a plurality of logogram phrases and a communal usage frequency for the plurality of logogram phrases.

18. The program product of claim 15, the code further performing:
displaying a first logogram list of logograms embodying the first logogram radical of the two or more logogram radicals based on a usage history; and
receiving a selection of a first logogram from the first logogram list,
wherein the one or more logogram phrases are generated in response to the first logogram and the second logogram radical of the two or more logogram radicals.

19. The program product of claim 18, wherein the logogram phrase list is based on and prioritized using a usage history.

20. The program product of claim 15, the code further performing:
displaying a candidate logogram radical list of the two or more logogram radicals; and
receiving a selection of a logogram radical.

* * * * *